3,183,179
TWO STAGE HYDROCRACKING-DESULFURIZATION PROCESS

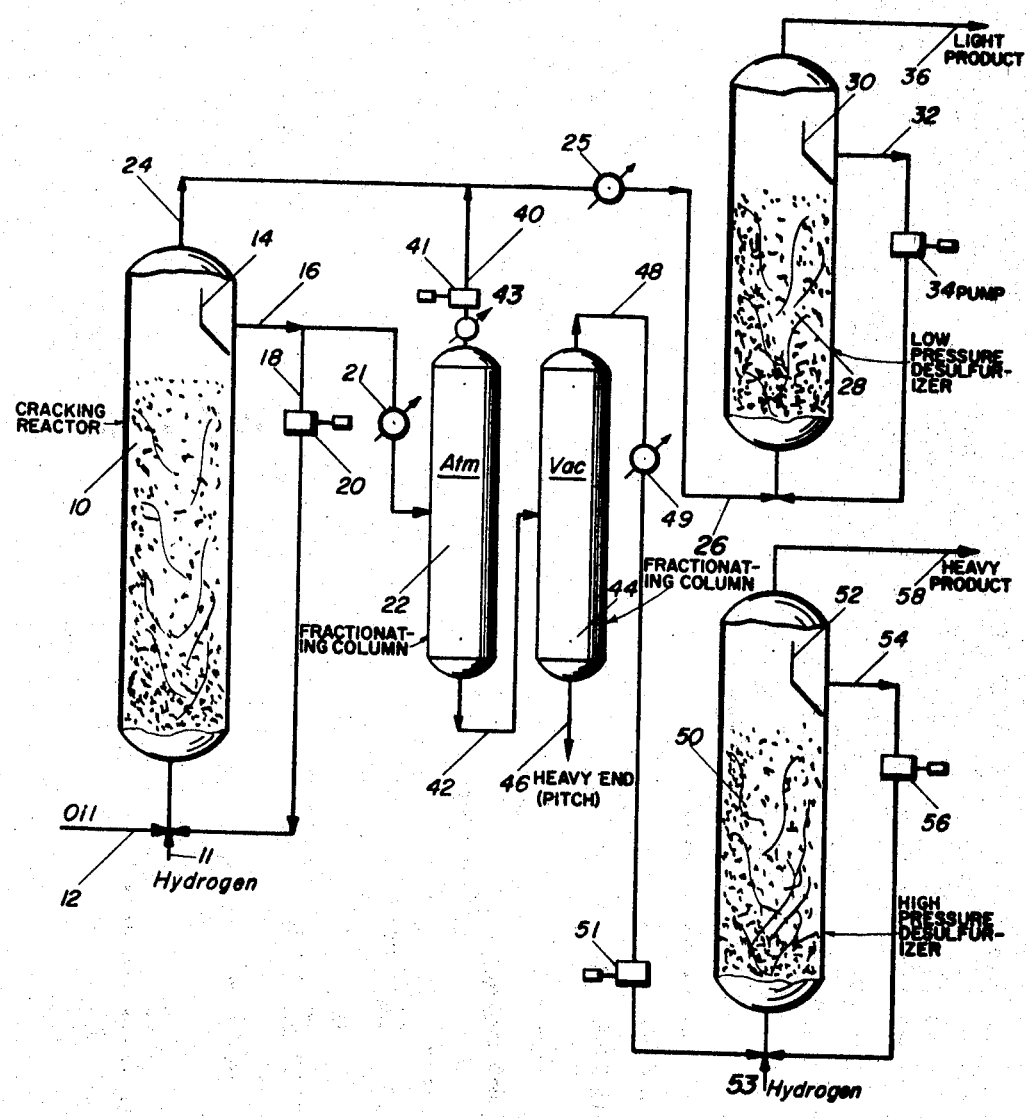

Seymour C. Schuman, Princeton, N.J., assignor to Hydrocarbon Research, Inc., New York, N.Y., a corporation of New Jersey
Filed May 28, 1962, Ser. No. 198,139
3 Claims. (Cl. 208—97)

This invention relates to the treatment of hydrocarbon oils with hydrogen in the presence of catalysts. More particularly, the invention is concerned with the treatment of heavy hydrocarbon oils to effect hydrodesulfurization. It is an improvement on my copending application, Serial No. 786,490, filed January 13, 1959, now U.S. Patent 3,050,459.

Hydrogenation has long been used to refine hydrocarbon oils and is a highly developed art insofar as the catalysts, temperatures, pressures and other process variables are concerned. Notwithstanding the extensive advances which have been made in hydrogenation, the initial costs of suitable catalysts and the cost of replacement of such catalysts remain an important economic problem in the commercial utilization of hydrogenation. Catalysts for the hydrodesulfurization of oils tend to become rapidly fouled with carbonaceous deposits and other contaminants in the charge stock, so that the activity of the catalyst can be maintained only by frequent regenerations or replacement. Regeneration of the catalyst necessitates interruption of the hydrodesulfurization operation or, as is more frequently the case, the provision of duplicate reactors so that while one reactor is on stream for the treatment of the charge stock, the other reactor is undergoing regeneration of the catalyst. In either case, the costs associated with regeneration or replacement of the catalyst materially affect the economics of the hydrodesulfurization process. These costs so increase when the charge stock is a heavy hydrocarbon oil that heretofore it has not been practical to refine such a heavy oil by the catalytic hydrodesulfurization process.

An important improvement in the art of treating heavy hydrocarbon oils in the presence of catalysts has been effected by a recent development of Keith-Layng described in the U.S. Patent 2,987,467. In accordance with that development, the hydrodesulfurization of a heavy hydrocarbon oil is advantageously carried out in two successive steps. The gist of that invention is the liquid-phase hydrocracking of heavy hydrocarbons as a preparatory operation so that the sulfur present in such hydrocarbons is better exposed to and more reactive with hydrogen during subsequent liquid-phase catalytic hydrogenation. By that invention, it has been found possible to diminish the quantity of catalyst used and, at the same time, reduce the frequency of regeneration of the catalyst or even eliminate such regeneration, since fouling up of the catalyst occurs to a much smaller degree than heretofore experienced.

In my foregoing invention the very high boiling hydrocarbons from the cracked hydrocarbons leaving the first stage of the process were removed as it was found that the contamination of the hydrogenation catalyst in the second stage was due mainly to impurities which are present in the hydrocarbon oil to begin with and which collect almost entirely in the liquid hydrocarbon fraction boiling above about 900° F. Such impurities which act as catalyst poisons include asphaltenes, highly condensed aromatic compounds, and inorganic or metallo-organic compounds. By eliminating these contaminants from the precracked hydrocarbons entering the secondary stage, the life of the catalyst is increased to a marked extent.

One of the features of my previous invention was the simple separation of the liquid and vapor phases from the first stage reactor at reactor outlet conditions. Thus, in many cases, the material passing to the secondary stage is simply the vapor phase effluent from the first stage reactor. However, in other cases, the liquid phase effluent from the first stage reactor is further processed by flashing and even by vacuum distillation to yield additional charge to the secondary stage reactor. However, as mentioned, in all cases, the feed to the secondary stage contains little or no material boiling above about 900–1100° F., so that contamination of the second stage catalyst is minimized.

It should be noted that in my previous invention, the feed to the second stage reactor contains hydrocarbonaceous material extending over the complete possible distillate boiling point range. Thus, the feed to this stage contains low boiling point hydrocarbons such as those generally noncondensible at room temperature, material boiling in the gasoline or naphtha range with an end point about 400° F., material in the furnace oil range boiling to about 700° F., and material in the gas oil range boiling to about 900–1100° F. In the second stage it is desirable to improve the quality of these fractions generally by substantial removal of sulfur, nitrogen and or oxygen compounds which are present. It is also desirable to improve the quality of fractions boiling in the furnace oil and heavy gas oil range by adding hydrogen to unsaturated and aromatic compounds to improve their burning quality. In this respect, however, it is undesirable to add hydrogen to molecules boiling in the naphtha or gasoline range, since such addition of hydrogen generally results in the conversion of high anti-knock aromatic compounds to lower octane rating (more saturated) compounds. Finally, it is very often desirable to carry out additional cracking in the second stage, primarily to convert heavy gas oil to the more salable furnace oil and gasoline products, and additionally at times, to even convert furnace oil to gasoline. It is apparent that it is difficult to carry out all of these diverse objectives in a single secondary reactor operating at given operating conditions; for example, it is generally advantageous to utilize low temperatures for the addition of hydrogen to unsaturated compounds, whereas high temperatures are generally required to carry out cracking. However, I have now found out a way of obtaining the versatility and flexibility required in the secondary stage with great simplicity and at lower overall cost than in my previous invention.

Thus, it is an objective of the present invention to provide a superior process for the hydrogenation of heavy oils.

A further object of the invention is to carry out the conversion in multiple stages so that secondary stages are not subjected to the deleterious effects of asphaltenes, resins, and organo-metallic compounds present in heavy oils, thus affording large economies in catalyst utilization cost.

A further object of the present invention is to obtain flexibility in the secondary stage of treatment so that the ultimately desired products can be obtained of high quality, with the lowest possible investments and catalyst utilization costs. It is important that the method of accomplishing these objectives be simple to avoid increasing the investment and to avoid making the overall plant too complex.

To facilitate understanding of the present invention, reference is now made to the accompanying drawing which diagrammatically provides a typical flow sheet embodying the process of the invention.

The reactor 10 is adapted to treat preheated heavy oil supplied in line 12. The heavy oil is mixed with hydrogen from line 11, the hydrogen stream generally consisting of fresh hydrogen, and hydrogen recycled after condensation of the ultimate liquid products from the overall process (lines not shown). The hydrogen-oil mixture is further combined with liquid recycle from the first stage reactor as taught in the invention of Pichler, 2,910,433. This combined feed then enters reactor 10 and is contacted at an elevated temperature and pressure conditions elucidated by the Keith-Layng invention and by my earlier invention. The liquid phase cracked oil and the gasiform phase of the reaction effluent from reactor 10 are then separated in the upper part 14 of the reactor, with most or all of the liquid phase withdrawn through line 16 to provide the liquid recyle feed described above. This recycle is obtained in line 18, and in the embodiment shown, is carried by pump 20 back to the inlet of reactor 10. The net liquid product is then cooled slightly in exchanger 21 and passed to the atmospheric flash tower 22 to separate high boiling and low boiling elements. The latter are cooled in exchanger 43 and then carried by means of pump 41 through line 40 to join the vapor stream removed at 24 from reactor 10. The combined stream now contains almost all of the hydrogen, non-condensible hydrocarbons, naphtha and furnace oil produced in reactor 10 and very little of the heavy gas oil and essentially none of the residual material boiling above 900–1100° F. This overhead stream, after cooling in exchanger 25, if required, is passed to reactor 28. In reactor 28, the feed is contacted catalytically in an apparatus and under conditions favorable for carrying out the desired reactions on the relatively light components which are present. The products, after issuing from reactor 28 through line 36 are recovered by conventional means.

The bottoms from atmospheric still 22 are passed through line 42 to vacuum still 44. In the vacuum still, this stream is separated further to a vacuum still bottoms removed through line 46 essentially consisting of material boiling above about 900–1100° F. and an overhead fraction removed through line 48. The vacuum still bottoms removed through line 46 may be then used for refinery fuel, for fuel to the process of this invention, or as raw material to produce hydrogen as used in this invention. The vacuum still overhead removed in line 48 is cooled and condensed in exchanger 49 and passed with the help of pump 51 into reactor 50. This stream contains most of the heavy gas oils boiling between about 650° F. and 900–1100° F. produced in reactor 10. Catalytic processing of this stream is accomplished in reactor 50 with additional hydrogen feed through line 53. Again, the design and operating conditions used in reactor 50 are adapted to produce the desired reactions on material boiling essentially in the heavy gas oil range. The products issuing from reactor 50 through line 58 are recovered conventionally, after which a substantial part of the hydrogen is recycled to re-enter the reactor system through line 11 or line 53.

In the embodiment shown, advantage is taken of the invention of Pichler to cope with the large amounts of heat produced in reactors 28 and 50 by the use of reactor effluent liquid recycle. Such recycle is shown in the flow sheet by means of line 32 and pump 34 feeding reactor 28, and line 54 and pump 56 feeding reactor 50. It should be understood that there are other possible arrangements for such recycle wherein the recycle lines are within the reactor as shown in Garbo application, Serial No. 154,147, filed November 22, 1961, or where a pump is not employed.

Similarly, the catalyst in reactors 28 and 50 is shown to be in an ebullated bed as described by Johanson, 2,987,465. Here again, although this is a preferred embodiment of the invention, other possibilities are apparent to those skilled in the art.

What is essential in the present invention is the use of a multiple stage reaction system represented by reactors 10, 28, and 50, the separation of the vapor and liquid streams from reactor 10 in lines 24 and 16 respectively, the removal of deleterious components from line 46, and the relatively simple production of the two streams 26 and 48 which are separately treated to the fullest advantage in the two secondary reactors.

As promoting agents for the hydrogenation and cracking operation in reactor 10 comminuted solids may be used to advantage. I have found that the reaction desired in this first stage can be carried out effectively using solids as diverse as clay, iron ore, and iron-clay waste from aluminum recovery operations, and spent synthetic hydrogenation catalyst. The effectiveness of so diverse a range of materials suggests that many other ores, minerals, spent and fresh synthetic materials can be advantageously used. It is possible that the quality common to these solids is the presence of at least a small amount of elements in groups V, VI, VII, VIII; however, I do not wish to be limited by such a hypothesis so difficult to establish.

The solid utilized in reactor 50 is a synthetic catalyst of the type generally referred to as sulf-active hydrogenation catalyst. Among the more prominent catalysts which may be used are cobalt deposited on alumina, tungsten sulfide and the mixed oxides of iron and chromium. A preferred catalyst for this reactor would be one deposited on a support containing acidic properties such as silica-alumina; in this case the hydrogenation component might be nickel sulfide, or the mixed sulfides of nickel and tungsten.

The catalyst used in reactor 28 is similarly of the sulf-active hydrogenation type. In most cases, it will be unnecessary to utilize highly acidic bases. Thus, a preferred catalyst is the conventionally used cobalt-molybdate or nickel-molybdate on alumina.

All of the reactors in the process are utilized at elevated temperatures and pressures. In the first stage reactor 10, in which at least 25% by volume of the oil boiling above about 1000° F. is cracked to material boiling below about 1000° F., the temperature will generally not exceed 1000° F., and preferably will be in the range of 825° to 950° F. while the pressure will not exceed 5000 pounds per square inch gauge (p.s.i.g.) and preferably will fall in the range of 800 to 3000 p.s.i.g. Conditions in reactor 50 will be generally similar except that that the pressure in no case would exceed 3000 pounds per square inch gauge (p.s.i.g.), and temperatures will in no case exceed 875° F., and may be as low as 600° F. Still milder conditions are employed in reactor 28 with the operating pressure in no case exceeding 2500 p.s.i.g. and preferably in the range of 600–1500 p.s.i.g., and with the temperatures generally between 550° F. and 800° F., and preferably between 600° and 750° F.

Although in the present invention, two secondary reactors are utilized instead of one in my previous invention, the cost of the two reactors has been found to be approximately the same as that of the single secondary reactor in the previous invention. Essentially, this saving results from the fact that pressures in reactor 28 can be decreased considerably due to the fact that this reactor processes only very light material, and space velocities correspondingly increased, with the net result that this reactor (together with its auxiliaries) costs very little. Similarly, catalyst deterioration and ultimate catalyst consumption in reactor 28 is sharply reduced because of the relatively light feed stock processed in it.

Example

The application considered is that for a European refinery where it is desirable to produce more furnace oil together with as little naphtha as possible from residuum raw materials. The plant is designed as in the figure referred to above. The charge stock oil fed through line 12 is 1000 barrels per day (b./d.) of Kuwait vacuum residuum of 8.30 API gravity, and a sulfur content of 5.3 w. percent. The catalyst utilized in reactor 10 is a mixture of fresh cobalt-molybdate catalyst, and discard cobalt-molybdate catalyst from reactors 28 and 50, together with discard cobalt-molybdate and nickel molybdate catalyst available from other refineries. Reactor 10 is operated at a pressure of 3000 p.s.i.g., a temperature of 850° F., and a space velocity of 1.0 v./hr./v. Fresh and recycle hydrogen are fed through pipe 11 corresponding to 6000 standard cubic feet per barrel per day. A liquid recycle stream 15 established in line 18 corresponding to a recycle ratio of 30 based on feed, sufficient to maintain the catalyst in the ebullated state described by Johanson.

In the operation, about 250 b./d. of pitch is removed from pipe 46. This pitch has a gravity of about 9° API and a sulfur content of 2.5 w. percent. It is completely satisfactory for refinery fuel, for which it is used in the example shown. Reactor 28 is charged with fresh cobalt-molybdate catalyst which is ebullated in the same way as described for reactor 10. However, reactor 28 is operated at the relatively mild conditions of 1000 p.s.i.g., and 750° F., with space velocity at 5 v./hr./v. (based on the hypothetical volume of liquid hydrocarbons in the feed to this reactor). No additional hydrogen is added to reactor 28 over that obtained in pipe 26 (ultimately obtained in the vapor stream from line 24).

In the application described here, reactor 50 is also charged with fresh cobalt molybdate catalyst. This reactor is operated at a pressure of 1500 p.s.i.g. and a temperature of 850° F., the relatively high temperature being necessary to hydrocrack heavy gas oil to the desired furnace oil. This reactor is sized to provide a space velocity of 1.5 v./hr./v. An additional 3000 standard cubic feet per barrel of fresh and recycle hydrogen are added through pipe 53. As in the case of the other reactors, internal liquid recycle is established to both remove process heat and ebullate the catalyst in the reactor.

The total yield of liquid products obtained is 1060 b./d., substantially greater than fed to the process. The distribution of this product is 160 b./d. of naphtha boiling to 350° F., 630 b./d. of furnace oil boiling to 700° F., 20 b./d. of heavy gas oil boiling to about 975° F., and 250 b./d. of pitch boiling above 975° F. (the latter essentially all obtained from line 46 as described above). Both the naphtha and the furnace oil produced are of excellent quality, the sulfur content of the naphtha being only about 0.01 w. percent, with the sulfur content of the furnace oil being 0.10 w. percent.

The net consumption of fresh hydrogen in the operation is only 1250 standard cubic feet per day per barrel of the original residuum charge.

To maintain the product distribution described above, and the quality of the naphtha and the furnace oil indicated, it is necessary to replace the catalyst continuously in all of the three reactors shown. This is accomplished with a net catalyst utilization corresponding to 6 cents per barrel of residuum fed through pipe 12.

In order to ascertain the efficacy of this invention, a comparison may be made with the analogous case where essentially, streams 48 and 26 are joined and passed to a single secondary reactor. In order to make a valid comparison between the two systems, the single secondary reactor is constructed to have the same volume as the sum of reactors 28 and 50 in this invention. On this basis, the capital cost of the single secondary reactor is about the same as that of the two reactors used in this invention since the single secondary reactor is constructed for 1500 p.s.i.g., whereas in the two secondary reactor case, reactor 28 is constructed at only 1000 p.s.i.g. The single secondary reactor is then operated with catalyst added to maintain naphtha and furnace oil sulfur content at the same level as indicated in the example for the two secondary reactors. However, it is found that the catalyst utilization rate in order to accomplish this corresponds to 9.5 cents per barrel of residuum charge instead of 6 cents per barrel as described for this invention. Even with this high catalyst utilization rate, it is impossible to produce furnace oil of the equivalent quality as obtained in this invention, since although the sulfur content could be maintained at 0.10 w. percent, its stability is considerably poorer than that produced in the invention covered by this application.

The 3.5 cents/bbl. savings illustrated for this invention, obtained on a commercial plant scale of 10,000 b./d., corresponds to a savings of about $350 per day or over $100,000 annually.

It should be understood that although the example provided translates the beneficial effects of my invention to a savings in the overall utilization of catalyst, comparisons can be made on other bases which show that at constant catalyst utilization rate, the effect of the invention described here would be to either reduce plant capital cost and/or to improve the overall quality of the product obtained.

I claim:

1. In a process for refining a sulfur-containing heavy oil having at least 10% by volume of hydrocarbons boiling above 900° F., in which said oil is cracked in a primary reaction zone, said oil being substantially in the liquid phase and in the presence of hydrogen at a pressure of at least 800 p.s.i.g. to convert at least 25% by volume of said hydrocarbons boiling above 900° F., and wherein the liquid components are separated from vapor components at the outlet of said reaction zone without substantial cooling of these components and essentially at reaction zone outlet conditions, and wherein said liquid components are fractionated to remove material boiling above about 900–1100° F., the improvement wherein the vapor overhead from such fractionating step is condensed and passed to a secondary reaction zone, reacting said condensate in liquid phase with hydrogen at a pressure of at least 800 p.s.i.g. and upflow in the presence of a particulate sulf-active hydrogenation catalyst at a temperature in the range of 600 to 875° F. to produce a heavy product, condensing the vapor component from the primary reaction zone, passing said condensate to another secondary reaction zone and reacting said condensate with hydrogen at a pressure of at least 800 p.s.i.g. in the presence of a particulate sulf-active hydrogenation catalyst to produce a light product.

2. A process for refining a sulfur containing heavy oil as claimed in claim 1 wherein the catalyst in the first mentioned secondary reaction zone is an alumina support having thereon a hydrocracking component of the class of nickel-cobalt-silica, nickel-cobalt-silica-fluoride, and nickel-tungsten-fluoride and the space velocity is in the order of 0.5 to 1.5 v./hr./v.

3. In a process for refining a sulfur-containing heavy oil boiling above about 1000° F. in which said oil is cracked in a primary reaction zone, substantially in the liquid phase and in the presence of hydrogen at a pressure of at least 800 p.s.i.g. to convert at least 25% by volume of the hydrocarbons boiling above 1000° F. to hydrocarbons boiling below 1000° F., and the vapor component from the reaction zone is condensed and passed to a secondary reaction zone wherein it is reacted with hydrogen in the presence of a particulate sulf-active hydrogenation catalyst to produce a light end product, and in which liquid components are separated from the vapor components at the outlet of the first reaction zone without substantial cooling of these components, and said liquid components are fractionated to remove material boiling above about 900–1100° F., the improvement which comprises condensing the vapor overhead from such fractionating step and passing the condensate to and upwardly through a third reaction zone together with hydrogen at a pressure of at least 1500 p.s.i.g., and at a temperature of about 850° F. with a space velocity of 1.5 v./hr./v., said third reaction zone having a particulate sulf-active hydrogenation catalyst therein, the velocity of the condensate being such as to place the catalyst in random motion in the liquid, whereby a heavy product is produced therein.

References Cited by the Examiner
UNITED STATES PATENTS

| | | | |
|---|---|---|---|
| 2,951,032 | 8/60 | Inwood | 208—97 |
| 2,987,467 | 6/61 | Keith et al. | 208—98 |
| 2,987,468 | 6/61 | Chervenak | 208—97 |

ALPHONSO D. SULLIVAN, *Primary Examiner.*

PAUL M. COUGHLAN, Jr., *Examiner.*